US010834454B2

(12) United States Patent
Hamidi-Rad et al.

(10) Patent No.: US 10,834,454 B2
(45) Date of Patent: Nov. 10, 2020

(54) PERSONALIZED PRESENTATION ENHANCEMENT USING AUGMENTED REALITY (71) Applicant: INTERDIGITAL MADISON PATENT HOLDINGS, SAS, Paris (FR)

(72) Inventors: Shahab Hamidi-Rad, Sunnyvale, CA (US); Subrahmanya Sandilya Bhamidipati, Sunnyvale, CA (US); Brian Charles Eriksson, San Jose, CA (US); Cong Han Lim, Madison, WI (US); Hasti Seifi, Vancouver (CA); Urvashi Oswal, Madison, WI (US); Annamalai Natarajan, Amherst, MA (US); Paris Syminelakis, Palo Alto, CA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/060,930

(22) PCT Filed: Dec. 12, 2016

(86) PCT No.: PCT/US2016/066079
§ 371 (c)(1),
(2) Date: Jun. 9, 2018

(87) PCT Pub. No.: WO2017/106807
PCT Pub. Date: Jun. 22, 2017

(65) Prior Publication Data
US 2018/0367835 A1 Dec. 20, 2018

Related U.S. Application Data (60) Provisional application No. 62/268,577, filed on Dec. 17, 2015, provisional application No. 62/268,582, (Continued)

(51) Int. Cl.
*H04N 21/488* (2011.01)
*H04N 21/41* (2011.01)
(Continued)

(52) U.S. Cl.
CPC ......... *H04N 21/4126* (2013.01); *G06T 11/60* (2013.01); *H04N 21/431* (2013.01);
(Continued)

(58) Field of Classification Search
None
See application file for complete search history.

(56) References Cited

U.S. PATENT DOCUMENTS 8,606,645 B1 * 12/2013 Applefeld ............. G06T 19/006
705/14.25
8,726,172 B1 5/2014 Vignocchi et al.
(Continued)

FOREIGN PATENT DOCUMENTS

CN 201336146 Y 10/2009
CN 101933027 A 12/2010
(Continued)

OTHER PUBLICATIONS

Scherp, Ansgar, "Semantics Support for Personalized Multimedia Content", Proceedings of the IASTED International Conference, Internet & Multimedia Systems & Applications and Visual Communications, Mar. 17-19, 2008, Innsbruck, Austria.
(Continued)

Primary Examiner — Justin E Shepard
(74) Attorney, Agent, or Firm — Jerome G. Schaefer (57) ABSTRACT A method of presenting personalized additional information along with displayed content includes accessing a content viewing history and a user profile. Detecting an event by extracting metadata related to content provided for display, the content provided for display related to other content not contained within the content viewing history, and accessing additional information related to the detected event. Additional features include overlaying an object onto the content being displayed on the content display device, and displaying background image information the surrounds the content display device in the view of the AR user. Any or all of the features may be present simultaneously.

10 Claims, 6 Drawing Sheets

Related U.S. Application Data filed on Dec. 17, 2015, provisional application No. 62/268,587, filed on Dec. 17, 2015.

(51) Int. Cl.
| | |
|---|---|
| *H04N 21/435* | (2011.01) |
| *H04N 21/45* | (2011.01) |
| *H04N 21/81* | (2011.01) |
| *H04N 21/84* | (2011.01) |
| *H04N 21/442* | (2011.01) |
| *H04N 21/431* | (2011.01) |
| *G06T 11/60* | (2006.01) |
| *H04N 21/466* | (2011.01) |

(52) U.S. Cl.
CPC ..... *H04N 21/435* (2013.01); *H04N 21/44218* (2013.01); *H04N 21/44222* (2013.01); *H04N 21/4532* (2013.01); *H04N 21/4667* (2013.01); *H04N 21/4884* (2013.01); *H04N 21/8133* (2013.01); *H04N 21/84* (2013.01); *G06T 2200/24* (2013.01)

(56) References Cited

U.S. PATENT DOCUMENTS

| | | |
|---|---|---|
| 8,884,984 B2 | 11/2014 | Flaks et al. |
| 8,913,085 B2 | 12/2014 | Anderson et al. |
| 2009/0013052 A1 | 1/2009 | Robarts et al. |
| 2009/0106671 A1 | 4/2009 | Olson et al. |
| 2010/0328460 A1 | 12/2010 | Merkel et al. |
| 2011/0161999 A1 | 6/2011 | Klappert et al. |
| 2012/0218297 A1 | 8/2012 | Ur |
| 2014/0111687 A1 | 4/2014 | Difrancesco et al. |
| 2014/0282192 A1 | 9/2014 | Grossman et al. |
| 2014/0344661 A1 | 11/2014 | Sipe et al. |
| 2015/0014417 A1 | 1/2015 | Finlow-Bates et al. |
| 2015/0187136 A1 | 7/2015 | Grimaud |
| 2015/0301596 A1* | 10/2015 | Qian ................ G06F 3/013 345/633 |
| 2016/0109940 A1* | 4/2016 | Lyren ............... G06F 3/011 463/2 |
| 2016/0155231 A1 | 6/2016 | Raghoebardajal et al. |
| 2016/0189268 A1* | 6/2016 | Gandhi ........... G06Q 30/0623 705/26.61 |
| 2016/0335645 A1* | 11/2016 | Holz ............... G06Q 30/0201 |

FOREIGN PATENT DOCUMENTS

| | | |
|---|---|---|
| CN | 102981616 A | 3/2013 |
| CN | 105164727 A | 12/2015 |
| WO | WO 2013157898 A1 | 10/2013 |

OTHER PUBLICATIONS

Herling, Jan et al., "Advanced Self-contained Object Removal for Realizing Real-time Diminished Reality in Unconstrained Environments", Ilmenau University of Technology.

Cascio Jamais, "Filtering Reality", Dec. 18, 2012, pp. 1-4, www.theatlantic.com/magazine/archive/2009/11/filtering-reality/3077131, retrieved on Aug. 4, 2016.

Communication pursuant to Rule 164(2)(b) and Article 94(3) EPC for EP 16 836 134.3-1213 dated Jun. 9, 2020 (EP Counterpart Application).

CN201336146Y TR EN machine full Aug. 31, 2020.

* cited by examiner

PERSONALIZED PRESENTATION ENHANCEMENT USING AUGMENTED REALITY

CROSS REFERENCE TO RELATED APPLICATIONS

This application claims the benefit, under 35 U.S.C. § 365 of International Application PCT/US2016/066079 filed Dec. 12, 2016, which was published in accordance with PCT Article 21(3) on Jun. 22, 2017 in English and which claims the benefit of U.S. provisional patent application Nos. 62/268,577, 62/268,582 and 62/268,587 all filed Dec. 17, 2015. The provisional and PCT applications are expressly incorporated by reference herein in their entirety for all purposes.

TECHNICAL FIELD

The present disclosure relates generally to an augmented reality interactive system and more generally to an augmented reality interactive system able to provide additional information related to content being viewed.

BACKGROUND

This section is intended to introduce the reader to various aspects of art, which may be related to various aspects of the present invention that are described and/or claimed below. This discussion is believed to be helpful in providing the reader with background information to facilitate a better understanding. Accordingly, it should be understood that these statements are to be read in this light, and not as admissions of prior art.

As users gain access to larger amounts of content and begin viewing content from a point after a series has begun or miss episodes of a series, then additional information may be necessary to provide background in order for the user to understand story lines or unfamiliar characters in scenes of the content. If a user does not understand a story, has missed an episode and cannot follow the current storyline, or is unaware of/unfamiliar with characters introduced during a missed episode, the user may lose interest and stop watching the content.

In order to retain viewer interest, broadcasters need to find ways to provide additional information to users as they are engaged in the content to assist in their understanding of the story and characters to prevent the user from becoming confused or lost by the story or characters.

Consequently, it is important to develop technology that is able to supplement the viewing of content with additional information to maintain a user's interest in the content so they continue to view future episodes of the content.

Current augmented reality (AR) systems cannot replace certain items in a background of the content with items which the user may find more pleasing or replace certain items with items more appropriate for users of a certain age. Current AR systems cannot replace or overlay certain specific items appearing within viewed content in an individualized manner allowing each user to view content which is personalized based on their viewer profile.

Current Augmented Reality (AR) interactive systems cannot create an enhanced viewing environment enabling an Augmented Reality (AR) user to feel as if they are part of the scene being displayed. Current AR interactive systems cannot supplement the viewing of content by providing an enhanced environment surrounding the screen of the content display device. Current AR interactive systems cannot provide a background image surrounding content being displayed in an individualized manner allowing each AR user to view enhanced content which is personalized based on their user profile.

SUMMARY

An augmented reality (AR) interactive system and method is provided. In one embodiment additional information related to content is provided by the augmented reality system. A content viewing history for each specific user within a profile of the augmented reality system is gathered. The content is provided for display using the augmented reality system. An event occurring in content provided for display that is related to other content not contained within the viewing history is detected. Additional information related to the detected event is correlated. The additional information related to the detected event is presented. The presentation is effected by the augmented reality system. In another embodiment gathering the content viewing history comprises gathering information of a viewing history of a user via access to a database. In a further embodiment providing the content using the augmented reality system comprises providing the content for display on a lens of augmented reality glasses. In a still further embodiment detecting an event occurring in the content that is related to other content that is not contained within the viewing history comprises detecting metadata in a scene within the content provided for display that is absent from the content viewing history. In one embodiment the detected metadata includes additional information identifying at least one of a previous episode, a precursor series, a plot background and a character introduction that is absent from the viewing history of the user of the augmented reality system. In a still further embodiment correlating additional information related to the detected event comprises searching a database for additional information related to the event. In an even further embodiment presenting the additional information related to the detected event comprises presenting the additional information as simultaneously with the displayed content in the augmented reality system. In one embodiment, the additional data may be presented as subtitles. Presenting the additional information related to the other detected event comprises pausing the displayed content such that the additional information can be presented to the user before resuming content presentation in a further embodiment. Presenting the additional information related to the detected event during a pause of the displayed content comprises presenting the additional information as subtitles in a still further embodiment. In another embodiment the additional information includes at least one of subtitles for conversations according to the users' preferred language or hearing abilities, information about the plot, information about previous episodes, character backgrounds and language/cultural connotations based on the users' viewing history and profile. In a further embodiment, providing the additional information includes receiving information regarding a position of the user interface relative to the content viewing device, determining a position for projection of the additional information and providing data identifying the position for projection of the additional information to the user interface. In one embodiment the information regarding a position of the user interface relative to the content viewing device includes an anchoring home position between the user interface and the content viewing device; and a current position of the user interface. In a still further embodiment projection of the additional information is not moved relative to the content viewing device when a center point of a field of view of the user interface is moved.

In another embodiment, an augmented reality (AR) interactive system is provided that comprises a controller device for providing additional information related to audio/video content being displayed. The controller device includes an interface for receiving audio/video content including metadata identifying characteristics of the audio/video content for display. A transmitter/receiver communicates with a user interface. A storage device stores user profiles and viewing history. A processor extracts the metadata from the audio/video content and compares the metadata to the user profile and viewing history to determine if data in the user profile and viewing history match the metadata. A router requests additional information from a remote server related to the audio/video content upon determining at least one of the user profile and viewing history do not match the metadata. The additional information received is provided to the user interface via the transmitter/receiver for display. In another embodiment the storage device comprises a user profile database for storing the user profile, the user profile including user preference information including language and user presentation preferences. In a further embodiment the storage comprises a viewing history database for storing the viewing history, the viewing history including information related to a viewing history of a user. The processor provides the additional information for display on a lens of augmented reality glasses in another embodiment. In a further embodiment the processor detects an event occurring in the content that is related to other content that is not contained within the viewing history by detecting metadata in a scene within the content provided for display that is absent from the content viewing history. In a still further embodiment the metadata detected by the processor includes additional information identifying at least one of a previous episode, a precursor series, a plot background and a character introduction that is absent from the viewing history of the user of the augmented reality system. In an even further embodiment the processor accesses additional information related to the detected event by searching a remote database for additional information related to the event. The processor presents the additional information related to the detected event simultaneously with the displayed content in the augmented reality system in one embodiment. The additional information can be presented as subtitles. The processor presents the additional information related to the other detected event by pausing the displayed content such that the additional information can be presented to the user before resuming content presentation in a still further embodiment. In an even further embodiment the processor presents the additional information related to the detected event during a pause of the displayed content by presenting the additional information as subtitles. In a yet further embodiment the additional information requested by the router includes at least one of subtitles for conversations according to the users' preferred language or hearing abilities, information about the plot, information about previous episodes, character backgrounds and language/cultural connotations based on the users' viewing history and profile. In an even further embodiment the processor receives information regarding a position of the user interface relative to the content display device, determines a position for projection of the additional information, and provides data identifying the position for projection of the additional information to the user interface with the replacement image. In a still further embodiment the information regarding a position of the user interface relative to the content display device includes an anchoring home position between the user interface and the content viewing device; and a current position of the user interface. In a yet further embodiment projection of the additional information is not moved relative to the content viewing device when a center point of a field of view of the user interface is moved.

In one embodiment, a method of presenting personalized additional information along with displayed content includes accessing a content viewing history and a user profile. Detecting an event by extracting metadata related to content provided for display, the content provided for display related to other content not contained within the content viewing history. Accessing additional information related to the detected event, and presenting the additional information related to the detected event for display on a content display device. The additional information may be presented as subtitles on the content display device. In an embodiment, presenting the additional information related to the detected event for display includes presenting the additional information to a user interface of an augmented reality system. The method may further include comparing the user profile and the metadata to determine if an object within the content is identified to be overlaid on the display and then select a replacement image for overlay of the object. The replacement image is then provided for display on the content display device. A provision of the replacement image includes receiving information regarding a position of a user interface of an augmented reality system relative to the content display device, determining a position for projection of the replacement image, and providing data identifying the position for projection of the replacement image to the user interface.

In an embodiment, the method may include accessing a background image from the extracted metadata associated with the content. The background content is provided to a user interface of an augmented reality system for projection at a position surrounding the content displayed on the content display device.

Providing the background content includes receiving information regarding a position of the user interface relative to the content viewing device and determining a position for projection of the background image. Data identifying the position for projection of the background image to the user interface is provided.

In one aspect of the embodiments, accessing a content viewing history and a user profile included accessing information of a viewing history of a user, and language and user presentation preferences via access of one or more databases. Detecting an event by extracting metadata related to content provided for display, where the content provided for display is related to other content not contained within the content viewing history includes detecting metadata in a scene within the content provided for display that is absent from the content viewing history. The detected metadata includes information identifying at least one of a previous episode, a precursor series, a plot background and a character introduction that is absent from the viewing history of the user.

In one embodiment, a controller device for providing additional information related to audio/video content being displayed includes a display interface driving a display of the audio/video content, a transmitter/receiver for communicating with a network providing the audio/video content including metadata identifying characteristics of the audio/video content, a storage device for storing a user profile and viewing history, and a processor for extracting the metadata from the audio/video content and comparing the metadata to the user profile and viewing history to determine if data in the user profile and viewing history match the metadata. A router requests additional information from a remote server related to the audio/video content upon determining that at least one of the user profile and viewing history do not match the metadata, wherein the additional information received is provided to the display interface for display on a content display device. The additional content may be displayed as subtitles.

In one embodiment, the controller device further includes a transmitter/receiver for a user interface of an augmented reality system. The storage device includes a user profile database for storing the user profile, the user profile including user preference information including language and user presentation preferences, and a viewing history database for storing the viewing history, the viewing history including information related to a viewing history of a user. The processor of the controller device detects an event occurring in the content that is related to other content that is not contained within the viewing history by detecting metadata in a scene within the content provided for display that is absent from the content viewing history.

In an embodiment of the controller device, the processor is configured to receive information regarding a position of the user interface relative to the content display device, determine a position for projection of a replacement image within the content for display, and provide data identifying the position for projection of the replacement image to the user interface with the replacement image. In an embodiment, the processor of the controller device is configured to access a background image from extracted metadata associated with the content, and provide the background content to the user interface for projection at a position surrounding the content displayed on the content display device.

In another embodiment, the inventive concepts herein may be embodied as instructions on a computer-readable media or data carrier, which, when executed by a computer, cause the computer to carry out the method described herein. Additional features and advantages are realized through the techniques of the present disclosure. Other embodiments and aspects of the configuration are described in detail herein. For a better understanding of the configuration with advantages and features, refer to the description and to the drawings.

BRIEF DESCRIPTION OF THE DRAWINGS

The invention will be better understood and illustrated by means of the following embodiment and execution examples, in no way limitative, with reference to the appended figures on which.

Wherever possible, the same reference numerals will be used throughout the figures to refer to the same or like parts.

DESCRIPTION

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of all such elements is not provided herein. In FIGS. 1-6, the represented figures provide examples that are purely functional entities and do not necessarily correspond to physically separate entities. Namely, they could be developed in the form of software, hardware, or be implemented in one or several integrated circuits, comprising one or more processors.

Figure 1:
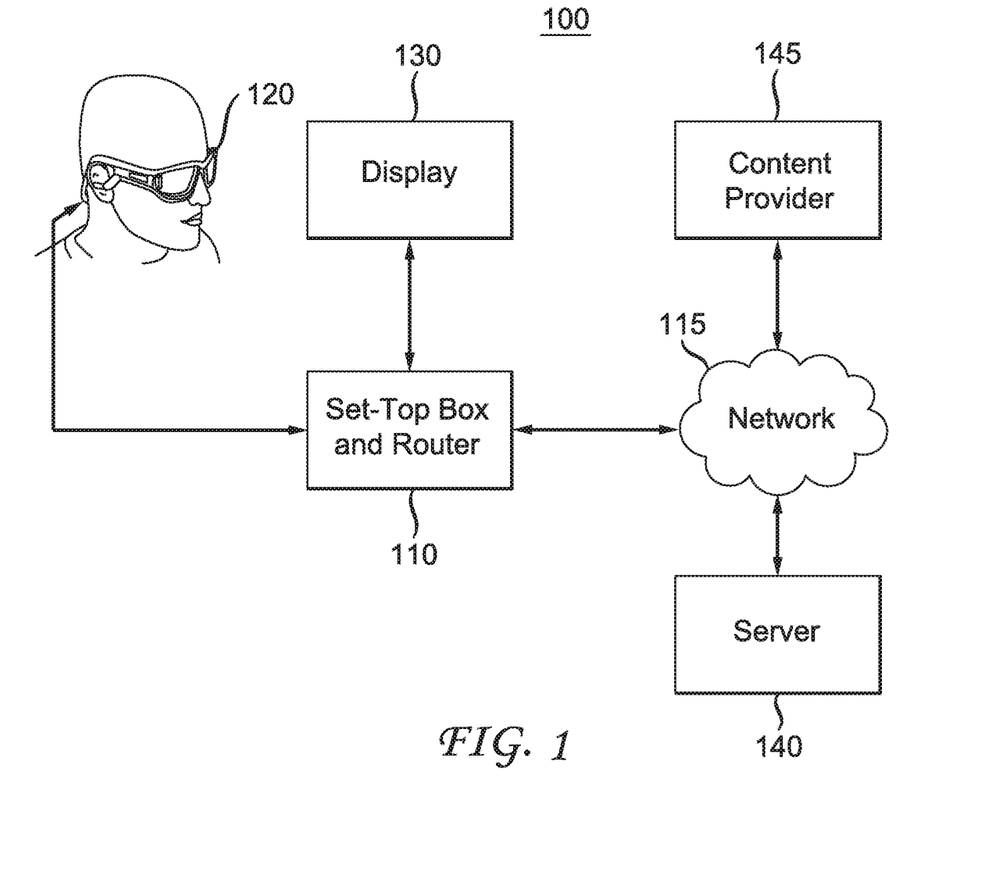
FIG. 1 depicts an augmented reality (AR) interactive system in accordance with an illustrative embodiment.

Augmented reality (AR) systems such as the one depicted in FIG. 1 at 100 provide a live direct or indirect view of a physical, real-world environment whose elements are augmented by computer processed or generated sensory input such as sound, video, graphics or other such data. In one embodiment, the augmented reality system 100 can be enhanced, modified or even diminished accordingly by a processor or computer. In this way and with the help of advanced AR technology, the real world information available to a user can be further enhanced through digital manipulation. Consequently, additional information about a particular user's environment and its surrounding objects can be overlaid on the real world by digitally enhanced components.

FIG. 1 is a depiction of an augmented reality (AR) interactive system 100 in accordance with an illustrative embodiment. The AR interactive system 100 comprises a set top box (STB)/router 110 that operates in conjunction with a user interface 120 and a display 130. The STB/router 110 also communicates with a remote server 140 via a network 115, such as the internet or a provider network. The user interface 120 may be in the form of glasses or eyewear worn by the viewer or alternatively some device, such as a hat visor, able to be positioned within a line of sight of the viewer without obstructing a view of content being displayed on the display 130. The STB/router 110 is connected to receive content from a content provider 145 either wirelessly or through a wired communication channel provided via network 115. The content provider 145 provides the content for viewing on the display 130. Embedded in the content received by the STB/router 110 is metadata providing additional information related to the content. Users viewing content using the AR interactive system may set up a profile identifying the user, the user's background and a viewing history for the user identifying content previously viewed by the user. The user profile may be stored in a database in any of the user interface 120, STB/router 110 and remote server 140. The viewing history may include information identifying shows and movies viewed by the user as well as information on which episodes of a series have been viewed by the user. The user profile may include user preference information including language and user presentation preferences. A user will log in when viewing so the user profile may be accessed by the STB/router 110. The user can login using the user interface provided by the AR device. Biometric devices included with the AR system could also be used for automatic authentication and login.

The viewing history may also be manually or automatically updated when the user views new content. Analysis of the viewing history and user profile may enable a determination of background images that may be pleasing to the AR user. The viewing history may also be manually or automatically updated when the AR user views new content.

When content is received, metadata embedded in the content may be extracted and compared with the viewing history and sensitivities to determine if content being viewed includes information not within the viewing history or that the user may benefit from additional information related to a scene of or characters within the content being reproduced. Such information may be related to a character in the scene or a story line introduced during an episode of the series, which the viewing history indicates the user did not see. The additional information may include background information that would assist a user in understanding of the story such as providing identifying information on a character or aspects of the plot line with which the viewer may not be familiar. The additional information may also include additional context to help in the understanding of actions or phrases used by characters appearing in the content and unfamiliar to the user. The metadata may include information identifying at least one of a previous episode, a precursor series, a plot background and a character introduction. Metadata embedded in the content may be extracted and compared with sensitivities indicated by the viewer profile to determine if items within the content being viewed may be objectionable to the AR user, may be inappropriate for the AR user to see or may be replaced by an item more pleasing to the AR user. Additionally, the replacement/overlay of items may be personalized for each AR user using and logged in to a user interface, i.e. the replacement items seen by each AR user through a personal user interface may be different based on each AR user's particular user profile and/or viewing history. Additionally, the replacement items for replacement of displayed content items for each AR user may be coordinated with each other and the scene in which they are placed to maintain conformity and not distract from viewing of the content. The replacement images may include but not limited to any of static images, video or 3D rendered objects. The replacement images are preferably 3D rendered objects when the content being overlaid is a 3D video or image.

In one aspect of the configuration, the AR system can also display images on a background of the room where the display device is displaying content. Thus, the room environment becomes an enhanced background environment surrounding the displayed content. In this context, background images are those images that are displayed to the user of an AR system that appear overlaid upon the room that surrounds the content display device. When content is received, metadata embedded in the content may be extracted and compared with or used in conjunction with the user profile to determine if a particular background image would be appropriate based on the content and preferences of the AR user. Additionally, the metadata may be used to search for background images related to the content or that include background images that are appropriate based on the content being displayed. The background images are generally related to the setting of the scene within the content being displayed. The background images may also be based on the user profile and sensitivities identified by the user profile indicating certain preferences of the AR user and used to enhance the viewing experience associated with the displayed content. Additionally, the background images may be personalized for each AR user using and logged in to a user interface, i.e. the background images seen by each AR user through a personal user interface may be different based on each AR user's particular user profile and/or viewing history. Additionally, the background images for each AR user may be coordinated with the scene it surrounds to maintain conformity and not distract from viewing of the content. The background image may include but is not limited to any of static images, video or 3D rendered objects. The background image is preferably 3D rendered objects when the content being surrounded and enhanced is a 3D video or image.

It is noted that additional information for display as subtitles in the displayed content does not mandate the use of an AR system. Such additional information to be displayed may be placed as subtitles to be displayed superimposed on displayable content. The content may be displayed on any suitable display device regardless of the use of an AR system. However, added enjoyment to the user of an AR system may be achieved using the principles of the disclosure.

A detected event occurring in the content that is related to other content not contained within the viewing history of a user identifies that additional information may be of assistance to the user. Additionally, the user profile may be compared with the metadata to determine if any cultural or language connotations present in the content may be unfamiliar to the viewer based on their background information. If it is determined a user may benefit from additional information related to the scene or explanation of cultural or language connotations, additional information explaining these connotations may be obtained. Upon determining that additional information should be provided to a user, the STB/router 110 may contact the remote server 140 to request this information. The additional information may be preferably stored in a remote database on the remote server 140 and accessed via the STB/router 110 when the comparison indicates additional information should be provided to the viewer. In one embodiment, the additional information is displayed to the viewer as subtitles in either a system that uses an AR user interface or in a system that displays contents without an AR interface.

The remote server 140 may be a general server that receives and stores information from broadcasters, a server associated with a content provider such as a cable or satellite company or a server controlled by a broadcaster of content. Alternatively, the server may be included at the STB/router 110 whereby the server receives and stores the additional information upon extraction of metadata from content to which the STB/router 110 is tuned. Preferably, the metadata will include information on how and where to access any additional information that is determined should be provided to a viewer. The STB/router 110 will then provide the additional information to the user interface 120. The user interface 120 may project the additional information onto a lens in the line of sight but in a position that does not obstruct a view of the content being displayed so it can be seen by the viewer. Alternatively, the additional information related to the detected event may be presented as subtitles simultaneously with the displayed content.

Presenting the additional information related to the other detected event may include pausing the displayed content such that the additional information can be presented to the user before resuming content presentation. Presenting the additional information related to the detected event during a pause of the displayed content may present the additional information as subtitles. Further, the additional information may include at least one of subtitles for conversations according to the users' preferred language or hearing abilities, information about the plot, information about previous episodes, character backgrounds and language/cultural connotations based on the users' viewing history and profile.

The additional information received may include information on the position at which the information is projected onto the lens or display of the user interface 120. The comparison of the metadata and viewing history may be performed in any of the user interface 120, STB/router 110, or remote server 140. Additionally, the viewing history may be stored in a database of the user interface 120, STB/router 110, or remote server 140.

Figure 2:
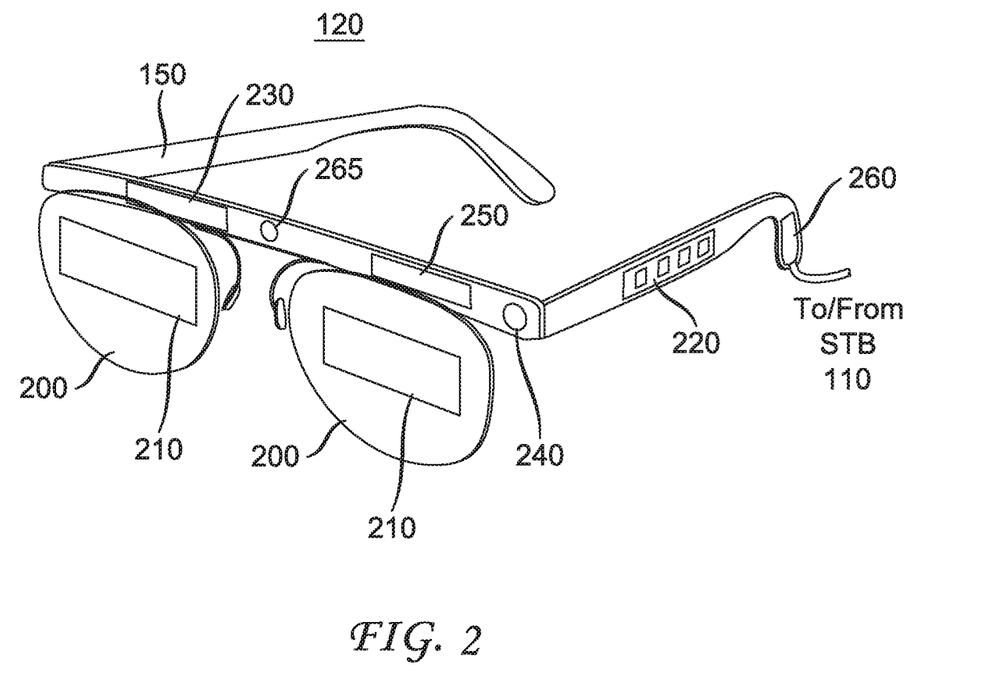
FIG. 2 depicts a set of glasses used with the AR interactive system in accordance with an illustrative embodiment providing additional information to a user.

FIG. 2 shows the user interface 120 in FIG. 1. The user interface 120 is depicted as a pair of augmented reality glasses 150 worn by a user. The user interface 120 comprises a pair of lenses 200, each lens including a rendering screen 210 for display of additional information received from the main control processor (see FIGS. 5, 6). The user interface 120 may also comprise different components that can receive user input in different forms such as touch, voice and body movement using sensors 230. In one embodiment, user inputs include a touch interaction area 220 useful to allow a user to control some aspects of the augmented reality glasses 150. For example, touch interaction area 220 can be used by viewers to log in to their user profile. The user interface 120 also includes an interface 260 to a set-top box (STB). Interface 260 includes a transmitter/receiver for communicating with the STB/router 110. This interface 260 may be either an RF interface, such as WiFi, or a cabled interface, such as an optical or wired cable. Interface 260 enables communication between STB 110 and user interface 120. Such communication includes user inputs to STB transmissions, such as user log in information to the STB, and STB 110 to user interface 120 transmissions, such as information for display by the rendering screens 210 on the user interface 120.

The user interface 120 in the embodiment of FIG. 2 may be in communication with touch interaction area 220, sensor(s) 230 and microphone(s) 240 via a processor 250. Processor 250 may be one or a plurality of processors. The sensor(s) 230, in one embodiment, can be a motion sensor but in other embodiments, the sensor(s) can be one of a variety of sensors that react to light, heat, moisture and/or also include gyros and compass components. The user interface may also include a camera 265. The camera 265 may be used to identify the position of a content display device 130 and anchor the user interface 120 to the content display device 130 as will be described herein below.

In the example depicted in FIG. 2, a plurality of processors 250 may be provided in communication with one another. By way of example, the processors may be embedded in different areas, one in the touch interaction area 220 and another one in head mounted components on the glasses 150. However, this is only one embodiment. In alternate embodiments, only one processor can be used and the processor may be freestanding. In addition, the processor(s) can be in processing communication with other computers or computing environments and networks. In the embodiment of FIG. 2 the user interface 120 is head mounted and formed as a pair of glasses 150. In practice, the user interface 120 may be any device able to provide a transparent screen in a line of sight of a user for projection of the additional information thereon at a position that does not obstruct viewing of the content being displayed. The glasses comprise the pair of see-through lenses 200 including the rendering screens 210. The glasses, in one embodiment, may be ordinary glasses that may be worn by a user and rendering screens may be permanently and/or temporarily added to them for use with the AR system 100.

In one embodiment as shown in FIG. 2, the head mounted user interface 120 can physically connect the components discussed such as the microphone, touch interaction area, rendering screens and others. Some of these components may be provided separately but situated in one housing unit conveniently in some embodiments. Alternatively, some or none of the components may be connected or collocated or housed in other embodiments as can be appreciated by those skilled in the art. Other embodiments can use additional components and multiple processors, computers, displays, sensors, optical devices, projection systems, and input devices that are in processing communication with one another as can be appreciated by those skilled in the art. Mobile devices such as smartphones and tablets which may include one or more cameras, micromechanical devices (MEMS) and GPS or solid state compass may also be used.

As indicated, FIG. 2 is provided as an example but in alternative embodiments, components can be substituted and added or deleted to address particular selections preferences and/or needs. For example, in one embodiment, there is no need for the touch interaction area. The user can simply provide input by gestures alone due to the use of the sensors. In another embodiment, voice and gestures may be incorporated together. In other embodiments, one component may be substituted for another if it creates similar functionality. For example, the touch interaction area 220 may be substituted with a mobile device, such as a cell phone or a tablet.

Furthermore, the head mounted user interface 120 can be one of many alternatives that embed or allow the user to see a private screen through specialty lenses and may be a part of a head-mounted display (HMD), a headset, a harness, a helmet for augmented reality displays, or other wearable and non-wearable arrangements as can be appreciated by those skilled in the art. In the alternative, none of the components may be connected physically or a subset of them may be physically connected selectively as can be appreciated by those skilled in the art.

Referring back to the embodiment of FIG. 2, the sensor(s) 230, rendering screens or display 210 and microphone(s) 240, are aligned to provide virtual information to the user in a physical world capacity and will be responsive to adjust accordingly with the user's head or body movements to allow for an augmented reality experience.

Figure 3:
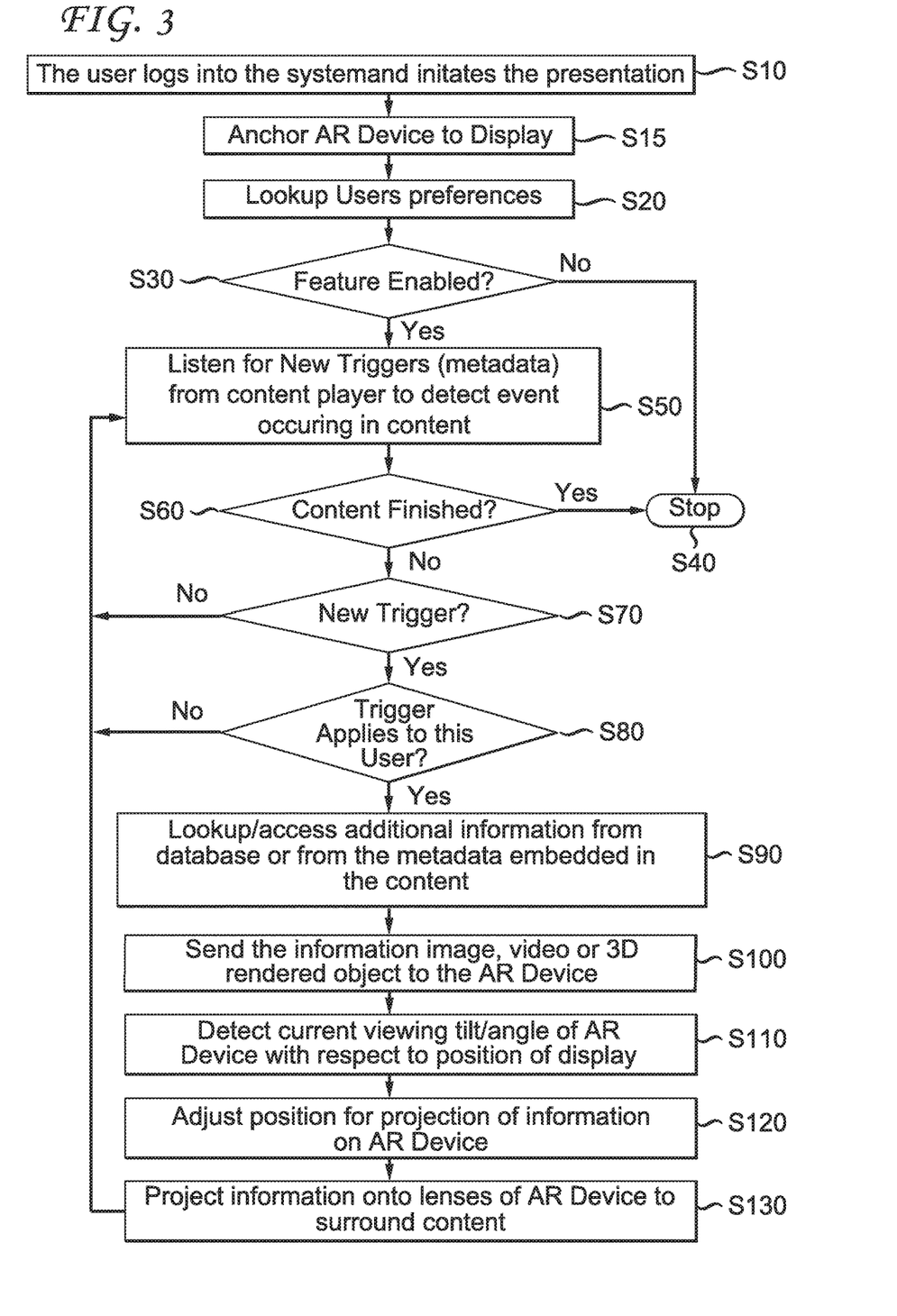
FIG. 3 depicts a flow diagram describing the method performed by the AR interactive system in accordance with an illustrative embodiment.

FIG. 3 is a flow chart illustrating the method performed in accordance with an illustrative embodiment. When it is desired to view content, a user may log into the system as described in S10. The user can login using the user interface provided by the AR device. Biometric devices included with the AR system could also be used for automatic authentication and login.

Once logged into the system, the user interface is anchored to the content display device 130 on which the content will be viewed as indicated in S15. Anchoring of the user interface to the display allows the user interface to determine where the display is positioned with respect to the AR device. Anchoring establishes a reference location of the display screen within the field of view of the AR user wearing a user interface 120. The initial position of the user interface with respect to the display upon anchoring will be termed the "anchoring home position" for purposes of this description. When determining the position of the display and where on the lenses of the user interface the additional information needs to be projected so as not to obscure the displayed content, movement of the user wearing the user interface from the anchoring home position may also be taken into account. Thus, when the user interface is being worn by an AR user and the user moves in some fashion such as by walking to another seat, turning their head or placing their head at an angle such as when laying down to view the content as opposed to sitting upright, the user interface is able to account for this movement and adjust the position at which additional information is projected on the lenses. This ensures the additional information will continue to be projected in a proper position so as not to obscure the displayed content. By anchoring the user interface to the display screen of the content display device, the user interface is able to calculate a proper position for projection of the additional information on the lenses thereof to not obscure the content being displayed.

Any of numerous methods may be used to anchor the user interface to the display. Some of these methods require a camera on the user interface. An exemplary method involves pattern recognition by the user interface. As the display screen is normally of a standard shape and generally affixed to a surface and thus stationary, the user interface may be moved in different directions and positioned at different angles while a camera connected thereto scans the area for the screen on the content display device. Upon recognizing the display screen by the camera, the user interface will be able to anchor to the position of the display screen. Another method of anchoring the user interface to the display screen includes the transmission of watermarks with the content being displayed. The watermarks may be positioned at corners of the content when being displayed to identify the edges of the displayable area of the content. A sensor on the user interface is able to detect the watermarks to determine the boundaries of the displayed content and thus anchor the user interface to the display screen. A further method of anchoring the user interface to the display is through an Infrared (IR) communication between the user interface and display similar to a remote control operation. Through the IR communication, the content display device can relay positioning information to the user interface or allow the user interface to detect the position of the display. Anchoring of the user interface to the display screen allows the user interface to determine the position of the content display device with respect to the position and orientation of user interface 120, such as the AR glasses 150, at any time while compensating for any movement of the user interface 120. The user interface 120 may also be able to sense any movement thereof and automatically adjust the projection of additional information upon sensing of the movement. This is possible due to the knowledge of the location of the content display device 130 or content being displayed with respect to the user interface 120.

Once logged into the system, the user's profile and viewing history are accessed as stated in S20. Alternatively, accessing of the user profile and viewing history may occur prior to anchoring the user interface to the content display device. The user profile includes information such as user preferences, user background such as country of origin, language, and other information. In S30, it is determined whether the feature for obtaining additional information during content viewing is enabled. If this feature is not enabled, the method proceeds to S40 and terminates. If the feature is enabled, the system checks for (listens for metadata, detects metadata) and extracts metadata embedded within the content being viewed and compares the metadata to data within the user profile and viewing history in S50. In this manner, the metadata may be considered a trigger to display additional information to the viewer.

The feature that is tested at step S30 may include one or more of (a) displaying additional information as subtitles that is not in the user's viewing history, (b) overlaying an object onto the content being displayed on the content display device, and (c) displaying background image information the surrounds the content display device in the view of the AR user. Any or all of these features may be present simultaneously. Each is discussed below.

From step S50, the system checks if display of the content is finished in S60. If it is determined that display of the content has finished, the method proceeds to S40 and terminates. If display of the content has not finished, in S70, the system continues to check for metadata that can trigger additional information to be displayed. If no metadata is detected, the system returns to S50 and continues to check for metadata. If metadata is detected, the metadata is compared with the user profile and viewing history to determine if the metadata indicates information relevant to the viewer is available in S80. Metadata that applies to the user can trigger additional information to be displayed. Such trigger metadata may apply if the metadata is related to other contents (metadata includes a list of content identifiers) and at least one of the related contents is not in the viewing history of the user. Other metadata may be determined to be a trigger if it specifies a demographic or cultural background that is different from the user's profile information. The metadata embedded in the content may include content ID's related to the content, e.g. information related to the content (season and episode number, introduction of characters, etc.) and information related to demographic and/or cultural background of the content. In order to determine if additional information should be provided to the viewer, it is determined if content ID's included within the metadata are absent from the user's viewing history or user profile indicating the viewer did not view content relevant to or necessary for understanding of the content being viewed.

Additionally, if the demographic and/or cultural background of the content is different from that in the user profile, additional information may be required to understand certain actions or language being used in the content being viewed. If it is determined additional information is not necessary based on the comparison of the metadata and viewing history or user profiles, the system returns to S50 and continues to check for additional metadata. If it is determined additional information is necessary based on the comparison of the metadata and viewing history or user profile, the system looks for additional information within the metadata or contacts a database in the remote server for additional information in S90.

The additional information is then provided to the user interface for projection thereon and viewing by the user in S100. Additional information related to content may include information on a story line that began or in which a significant plot twist occurred in an episode not within the viewing history and therefore determined to be missed by the viewer. Additional information related to demographic and/or cultural differences may include explanations of actions such as a handshake, which may be an unfamiliar gesture to someone of the viewer's background or a phrase or language that may be determined to be unfamiliar to someone from the geographic location of the viewer.

Prior to projection of the additional information, the user interface detects its current position and the current viewing tilt/angle with respect to the position of the display in S110. Determination of the current position and tilt/angle of the user interface with respect to the display is performed to provide a proper perspective mapping for projection of the additional information on the lenses of the user interface so as not to obscure the displayed content. While the display is stationary, the user interface is mobile and can be moved when, for example, a user changes their seat, moves their head to a different position or angles their head with respect to the display. Thus, in order for information to be properly mapped with respect to the content, the displacement of the user interface from the anchoring home position at which the display was anchored to the user interface may be calculated. The position of projection for the additional information is adjusted in S120. In S130 the additional information is projected onto the lenses of the user interface so as not to obscure the content being displayed. For example, if the user interface was anchored to the display with a first positional relationship, upon determining additional information should be projected on the lenses of the user interface, the user interface may accommodate for any change in the position of the user interface to project the information at the proper positon on the lenses of the user interface. If the user turns their head 20° to the right, projection of the additional information on the lenses of the user interface should be projected at 20° to the left (or in an opposite direction from the direction of movement of the user interface) from the anchoring home positon.

An additional feature may be detected at Step S30. At step S30, if it is determined that the feature for providing replacement images within the content displayed on a content display device is enabled, then step S50 is entered. At S50, the system checks for and extracts metadata embedded within the content being viewed and compares the metadata to data within the user profile and viewing history in S50. Based on the sensitivities of the user profile and viewing history, it is determined if certain items within the content may be inappropriate or objectionable to a user. In this manner, the metadata may be considered a trigger to obtain and project a replacement image to overlay the item within the content determined to be inappropriate or objectionable. This feature may be implemented in either an AR system, or one without AR capabilities. Steps S60-S130 can then apply as needed using the feature of providing replacement images within the content displayed on a content display device.

In an additional feature detected at step S30, the AR system can display images on a background of the room where the content display device is displaying the content. Thus, the room environment becomes an enhanced background environment surrounding the displayed content. In this context, background images are those images that are displayed to the user of an AR system that appear overlaid upon the room that surrounds the content display device. When content is received, metadata embedded in the content may be extracted and compared with or used in conjunction with the user profile to determine if a particular background image would be appropriate based on the content and preferences of the AR user. Additionally, the metadata may be used to search for background images related to the content or that include background images that are appropriate based on the content being displayed. The background images are generally related to the setting of the scene within the content being displayed. The background images may also be based on the user profile and sensitivities identified by the user profile indicating certain preferences of the AR user and used to enhance the viewing experience associated with the displayed content. Additionally, the background images may be personalized for each AR user using and logged in to a user interface, i.e. the background images seen by each AR user through a personal user interface may be different based on each AR user's particular user profile and/or viewing history. Additionally, the background images for each AR user may be coordinated with the scene it surrounds to maintain conformity and not distract from viewing of the content. The background image may include but is not limited to any of static images, video or 3D rendered objects. The background image is preferably 3D rendered objects when the content being surrounded and enhanced is a 3D video or image.

Thus, if at step S30, the feature of adding an immersive background around the content display device in an AR view is enabled, the system checks for and extracts metadata embedded within the content being viewed in S50. The metadata within the content includes at least one of a background image to be projected by the user interface or instructions for obtaining a background image. Metadata identifying the background image may be compared with the user profile and/or viewing history, to determine if the background image may be inappropriate or objectionable to an AR user. In this manner, the metadata may be considered a trigger to obtain and project a suitable background image to be projected by the user interface in a line of sight to surround the content being displayed. Steps S60-S130 can then apply as needed using the feature of providing an immersive background in an AR environment that surrounds the content display device.

Figure 4:
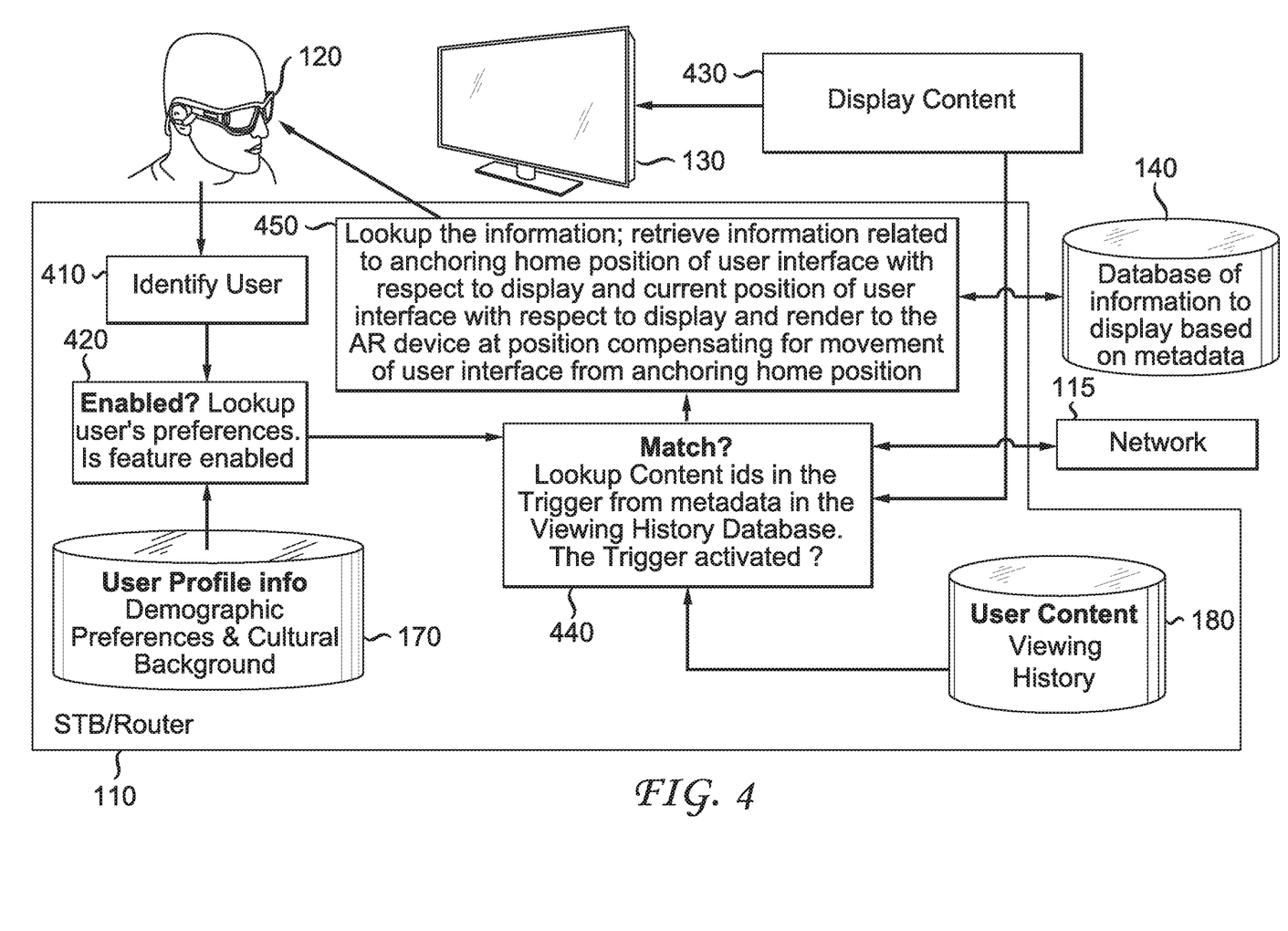
FIG. 4 depicts the AR interactive system in accordance with an illustrative embodiment showing interaction between elements of the system.

FIG. 4 shows interaction of the elements of the system in accordance with an illustrative embodiment. This figure shows the STB/router 110 communicating with the user interface 120 (AR glasses), display 130 and remote server 140 to provide additional information to the viewer. As can be seen via the directional arrows on FIG. 4, the STB/router 110 receives a signal from the user interface 120 identifying the user as in block 410. This signal may be indicative of a viewer logging in to access the user's profile. The STB/router 110 checks the user preferences in 420 included in the user profile in 170 to see if the feature is enabled and, if enabled, the STB/router 110 accesses the User Content Viewing history from a database contained therein. As discussed above, the feature may include one or more of (a) displaying additional information as subtitles that is not in the user's viewing history, (b) overlaying an object onto the content being displayed on the content display device, and (c) displaying background image information the surrounds the content display device in the view of the AR user. Any or all of these features may be present simultaneously.

Concerning the user profile information, the profile and viewing history for the user may be stored within the user interface 120 and accessible by the STB/router 110. The content is provided to the STB/router 110 from a content provider via network 115 and then to the display 130 for viewing. To check for feature (a) above, the STB/router 110 extracts the metadata embedded in the content and compares content identifiers (IDs) within the metadata with data in the viewing history database. If the content IDs are not contained within the viewing history, the STB/router 110 determines the viewer may have missed certain information related to the story or characters within the story and contacts the remote database for additional information related to the content being displayed. Upon receipt of the additional information, the STB/router 110 retrieves information related to the anchoring home position of the user interface with respect to the content display device and a current position of the user interface and renders the additional information image to the user interface at a position compensating for movement of the user interface from the anchoring home position as shown in 450.

To check for feature (b) above, the STB/router 110 accesses the user profile database 170 and viewing history from a database 180 contained therein. Alternatively, the user profile and viewing history for the user may be stored within the user interface 120 and accessible by the STB/router 110. The content is provided to the STB/router 110 from a content provider via network 115 and then to the content display device 130 for display as discussed in 430. The STB/router 110 extracts metadata embedded in the content and compares content identifiers (IDs) or other information within the metadata with data in the user profile and/or viewing history database as in 450. Based on this comparison, the STB/router 110 determines whether certain items or information within the content being viewed may be objectionable to or inappropriate for the AR user and contacts the remote database within server 140 for replacement images or information to be projected on the user interface so as to overlay or obstruct the objectionable or inappropriate images within the content being displayed. Alternatively, the user profile may include content ID's indicative of images, items or information that the user finds objectionable. If the metadata received with the content includes the content ID's included in the user profile, the STB/router 110 may determine certain items or information within the content being viewed may be objectionable to or inappropriate for the AR user and contacts the remote database for replacement images or information to be projected on the user interface. Upon receipt of the replacement images or information, the STB/router 110 provides the information to the user interface 120 for display.

To check for feature (c) above, the STB/router 110 accesses the user profile database 170 and viewing history from a database 180 contained therein. Alternatively, the user profile and viewing history for the AR user may be stored within the user interface 120 and accessible by the STB/router 110. The content is provided to the STB/router 110 from a content provider via network 115 and then to the content display device 130 for display as in 430. The STB/router 110 extracts metadata embedded in the content and compares content identifiers (IDs) or other information within the metadata with data in the user profile and/or viewing history databases as in 440. Based on this comparison, the STB/router 110 selects an appropriate background image that is not objectionable to or inappropriate for the AR user based on a comparison with user sensitivities identified in the user profile or viewing history and contacts the remote database within server 140 for the background image to be projected on the user interface so as to surround the content being displayed as in 450. Alternatively, the user profile may include content ID's indicative of images, items or information that the user finds objectionable. If the metadata received with the content includes the content ID's included in the user profile, the STB/router 110 may determine certain background images may be objectionable to or inappropriate for the AR user and contacts the remote database for an alternate background image to be projected on the user interface. Upon receipt of the background image, the STB/router 110 retrieves information related to the anchoring home position of the user interface with respect to the content display device and a current position of the user interface and renders the background image to the user interface at a position compensating for movement of the user interface from the anchoring home position as in 450.

Upon activation, the user interface 120 will anchor itself to the content display device 130 on which the content will be viewed. Anchoring of the user interface 120 to the content display device 130 allows the user interface 120 to determine where the content display device 130 is positioned with respect to the user interface 120. As the user interface 120 is mobile and can be moved to different places or rotated and positioned at different angles, its relationship to the stationary content display device 130 may change. When determining the position of the user interface 120 with respect to the content display device 130 and where on the user interface 120 additional information need to be projected to not obscure the content being displayed, movement of the AR user wearing the user interface 120 and the position of the content display device 130 with respect to the user interface 120 must also be taken into account. Thus, when the user interface 120 is being worn by an AR user and the AR user moves the user interface 120 from the anchoring home position in some fashion such as by walking to another seat, turning their head or placing their head at an angle such as when laying down to view the content as opposed to sitting upright, the user interface 120 is able to account for this movement and adjust the position at which additional information is projected. Alternatively, the user interface 120 can provide the STB/router 110 with information related to the anchoring home position and the current position of the user interface and the STB/router 110 can calculate the correct position for projection of the additional information by the user interface 120. This information can be provided to the user interface 120 with the additional information to be projected thereby. This ensures the additional information will continue to be projected in a proper position on a lens of the user interface to not obscure the content being viewed. Any of numerous methods, as previously discussed, may be used to anchor the user interface 120 to the content display device 130.

Figure 5:
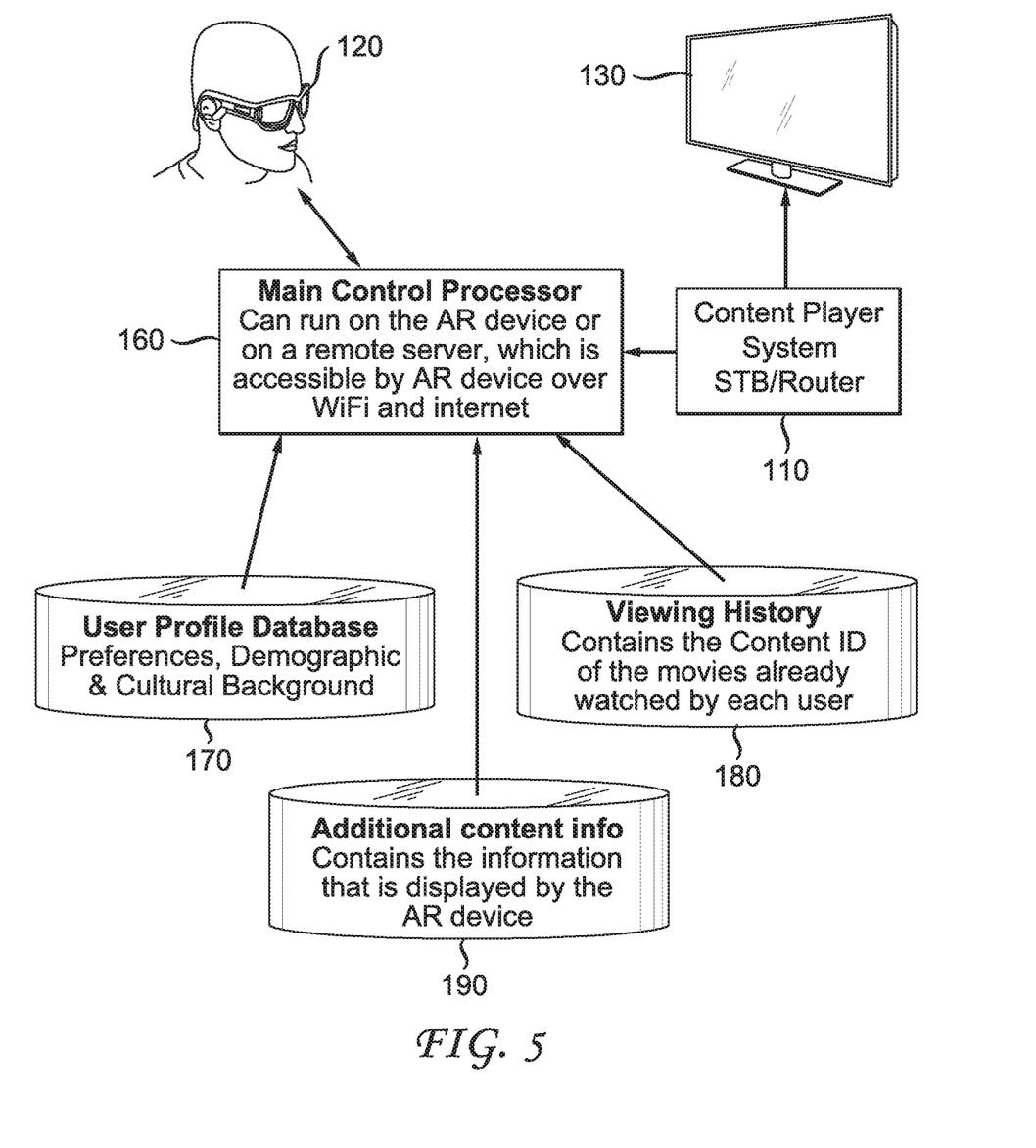
FIG. 5 depicts a server used by the AR interactive system in accordance with an illustrative embodiment and shows interaction with other elements of the system.

FIG. 5 depicts the interaction of the STB/router 110, user interface 120 and display 130. A main control processor 160 may be integrally formed within any of the user interface 120, STB/router 110 or remote server (not shown) connected to the STB/router 110. The main control processor 160 may be connected to a user profile database 170, a viewing history database 180 and an overlay content database 190. Overlay content database can contain any or all of additional information to be displayed as subtitles, overlay information for replacement object overlay in the content to be displayed on the display device, and background images for display outside of the perimeter of the display device. The user profile database 170 stores user profiles including user preferences and demographic and cultural backgrounds of users. The viewing history database 180 stores a viewing history for each user. The viewing history includes information on content viewed by a user when logged on to the system. The viewing history may be automatically updated when a user logs on to the system and views content. A user may also manually update the viewing history to include information on content viewed when not logged in to the system. The overlay content database 190 stores data representative of the additional information to be provided to a user related to the content upon determining that the viewing history of the user indicates that certain episodes or information related to the content have been missed by the user and/or that certain cultural or linguistic differences are present in the content. The additional information may be helpful to the user's understanding of the content and/or the cultural or linguistic differences present in the content. The main control processor 160 extracts the embedded metadata within the content and compares it with data from the user profile and viewing history to determine if information identified by the metadata is not included in the user profile or viewing history. If it is determined that information identified in the metadata is not included in the user profile or viewing history, the main control processor 160 accesses additional information within the overlay content database 190 related to the information identified as absent from the user profile and/or viewing history and provides the additional information to the user interface 120 for display thereon for the user.

The database 190 can also store data representative of the additional information and replacement images to be provided to a user related to the content upon determining that items within the content may be inappropriate or objectionable to the AR user. The additional information or replacement images may provide a more enjoyable experience for the user or prevent the user from viewing content that is inappropriate based on, for example, the user's age. The main control processor 160 extracts the embedded metadata within the content and compares it with data from the user profile and viewing history to determine if items within the content may be objectionable to or inappropriate for the user. If it is determined that information identified in the metadata may be objectionable to or inappropriate for the user, the main control processor 160 accesses additional information and replacement images within the overlay content database 190 that can replace or overlay the identified items to provide a more enjoyable experience for the AR user.

The database 190 can also store data representative of background images to be provided to the user interface related to the content upon determining a background image should be provided for viewing by the AR user. The background images may provide a more enjoyable experience for the user by creating an environment in which the AR user may feel immersed in the scene of the displayed content. The main control processor 160 extracts the embedded metadata within the content and may compare it with data from the user profile and viewing history to determine if items within a background image may be objectionable to or inappropriate for the AR user. If it is determined that information identified in the metadata may be objectionable to or inappropriate for the AR user, the main control processor 160 accesses background images within the background image database 190 that are provided to the user interface for projection on the lenses thereof. If it is determined that information identified in the metadata may be objectionable to or inappropriate for the AR user, the main control processor 160 accesses background images within the background image database 190 that are provided to the user interface for projection on the lenses thereof.

Figure 6:
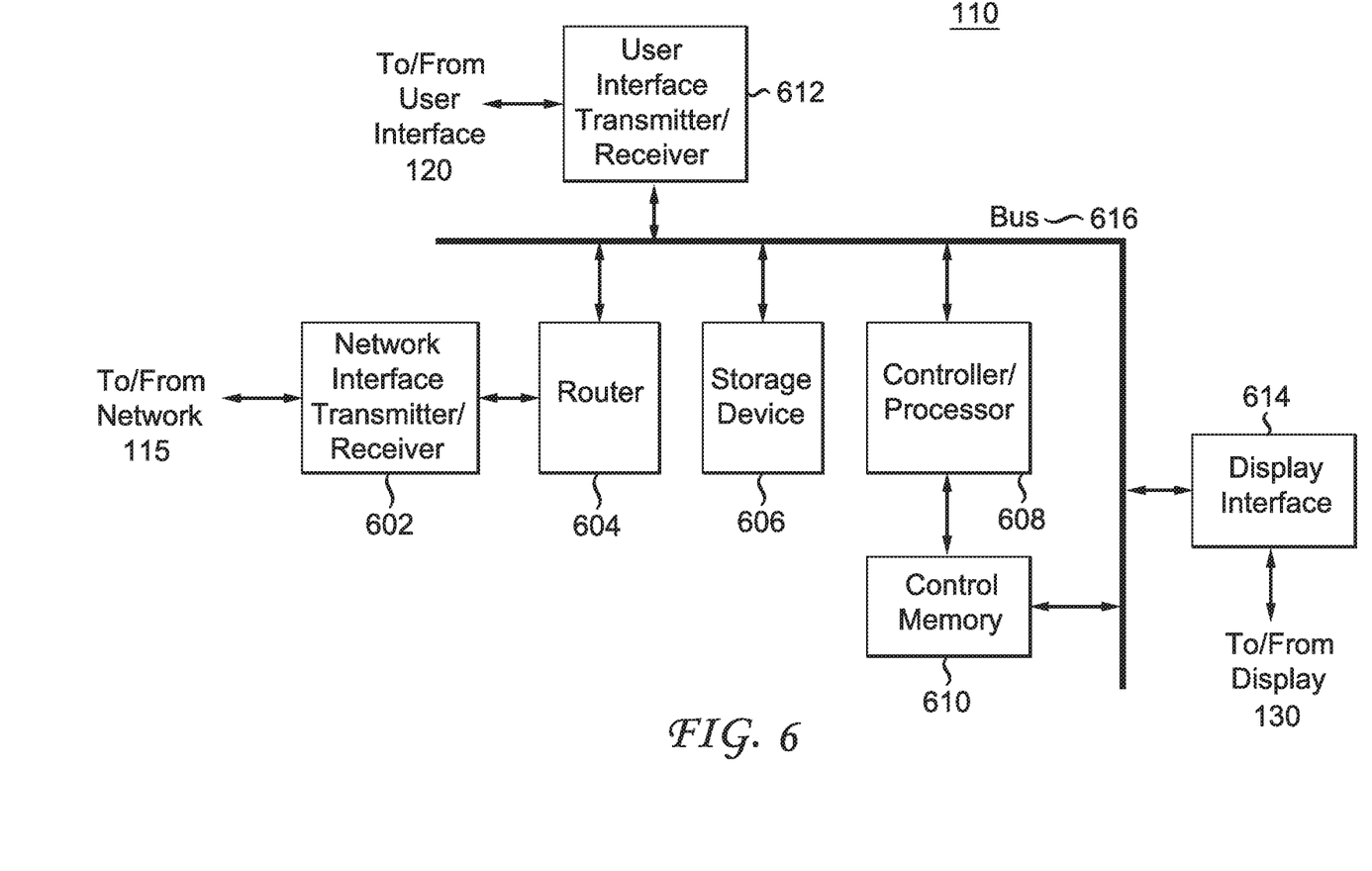
FIG. 6 depicts elements of a set-top box according to the configuration disclosed.

FIG. 6 depicts an exemplary block diagram of a set-top box 110 according to aspects previously discussed. In the depicted example embodiment, a processor 608 on a bus 616 controls elements that allow the performance of the method of FIG. 3. Processor 608 is supported by control memory 610 which can store instructions for processor 608. Such instruction can take the form of code in non-transitory ROM or other non-transitory computer instructions. Such control memory storage may be either internal or external to the STB 110.

The user interface 120 is serviced via a user interface transmitter/receiver 612 in FIG. 6, which transfers information between the user interface 120 and the STB 110. A network interface transmitter receiver 602 enables communication to and from the network 115, which allows access to network nodes server 140 and content provider 145 of FIG. 1. Router 604 functions to facilitate the processing of packets of information to and from server 140 and content provider 145. Information from server 140 and content provider 145 can be stored in storage device 606. Such information may include content to be displayed via display interface 614 and display 130 and corresponding metadata. Other information that may be stored in storage device 606 may include user profile information and viewer history. As discussed in conjunction with FIGS. 3, 4, and 5, such information is used by processor 608 to determine if metadata triggers the display of additional information to be displayed on user interface 120.

The augmented reality system 100 of FIG. 1, can be used in a variety of circumstances, especially to provide an enhanced experience when viewing audio/video content. Based on a viewing history of a user or a profile identifying demographic and cultural information of a user, the system can provide additional information regarding the content in a non-obtrusive manner that does not detract from the experience of viewing the content. Additionally, the system in accordance with an illustrative embodiment can operate in a theater during a movie or theatrical performance. In such instance, a server can be provided to transmit additional information related to the film or production to a user interface providing the viewer with background on the story line, characters or interesting facts related to, for example, the content, its production or the actors and artists involved in creating the content.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms. For example, implementation can be accomplished via a hardware apparatus, hardware and software apparatus. An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device.

Additionally, the methods may be implemented by instructions being performed by a processor, and such instructions may be stored on a processor or computer-readable media such as, for example, an integrated circuit, a software carrier or other storage device such as, for example, a hard disk, a compact diskette ("CD" or "DVD"), a random access memory ("RAM"), a read-only memory ("ROM") or any other magnetic, optical, or solid state media. The instructions may form an application program tangibly embodied on a computer-readable medium such as any of the media listed above or known to those of skill in the art. The instructions thus stored are useful to execute elements of hardware and software to perform the steps of the method described herein.

The invention claimed is:

1. A method comprising:
comparing a user profile and metadata related to digital multimedia content provided for display on a first display to determine whether an object within the digital multimedia content is to be replaced by a replacement image when the first display is viewed through a wearable user interface, wherein the first display displays the digital multimedia content including the object within the digital multimedia content;
accessing the replacement image of the object displayed on the first display, the replacement image to be viewed using the wearable user interface, the replacement image accessed based on the comparing;

projecting the replacement image on a lens of the wearable user interface, the replacement image seen when the digital multimedia content on the first display is viewed through the wearable user interface;

accessing a background image from the metadata related to the digital multimedia content; and providing the background image to the wearable user interface for projection at a position surrounding the digital multimedia content display device.

2. The method of claim 1, further comprising presenting additional information for display as subtitles related to the digital multimedia content provided for display wherein the additional information is not in a user viewing history.

3. The method of claim 1, further comprising presenting additional information for display to a user interface of an augmented reality system.

4. The method of claim 1, wherein projecting the replacement image on a lens of the wearable user interface includes:
receiving information regarding a position of a user interface of an augmented reality system relative to the digital multimedia content display device;
determining a position for projection of the replacement image; and
providing data identifying the position for projection of the replacement image to the wearable user interface.

5. A controller device comprising:
a display interface driving a first display of audio/video digital multimedia content;
a network transmitter/receiver for communicating with a network providing the audio/video digital multimedia content including metadata identifying characteristics of the audio/video digital multimedia content;
a storage device for storing a user profile;
a processor using the metadata from the audio/video digital multimedia content and the user profile to determine whether an object within the digital multimedia content is to be replaced with a replacement image when the first display is viewed through a wearable user interface;
the processor operating to request the replacement image for the object based on the determination, wherein the replacement image is provided to a wearable user interface transmitter/receiver, the replacement image projected on a lens of the wearable user interface, the replacement image seen when the audio/video digital multimedia content on the first display is viewed through the wearable user interface; and
wherein the processor accesses a background image from metadata associated with the digital multimedia content and provides the background image to the wearable user interface transmitter/receiver for projection at a position surrounding the digital multimedia content display device.

6. The controller device of claim 5, further comprising wherein the wearable user interface transmitter/receiver drives additional information as subtitles to overlay on the display, wherein the additional information is not in a user viewing history.

7. The controller device of claim 6, wherein the wearable user interface transmitter/receiver communicates with a user interface of an augmented reality system.

8. The controller device of claim 5, wherein the storage device comprises a user profile database for storing the user profile, the user profile including user preference information including language and user presentation preferences.

9. The controller device of claim 5, wherein the processor is configured to:
receive information regarding a position of the wearable user interface relative to the digital multimedia content display device;
determine a position for projection of the replacement image onto the digital multimedia content for display as viewed from the wearable user interface; and
provide data identifying the position for projection of the replacement image to the wearable user interface transmitter/receiver.

10. The controller device of claim 5, wherein the processor is a component of a set-top box or router.

* * * * *